Oct. 17, 1950 J. STADTMILLER 2,526,514
ADVERTISING DISPLAY DEVICE WITH INTERMITTENTLY
ROTATED NEON SIGNS
Filed Feb. 15, 1947 3 Sheets-Sheet 2
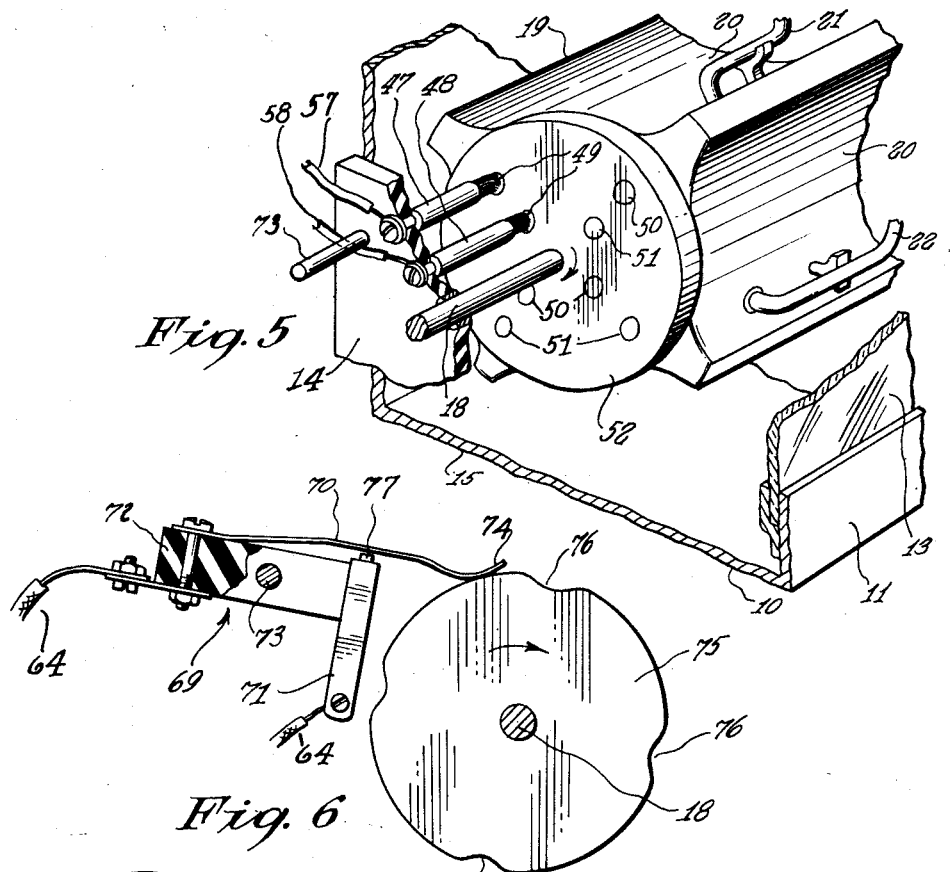
Fig. 5
Fig. 6
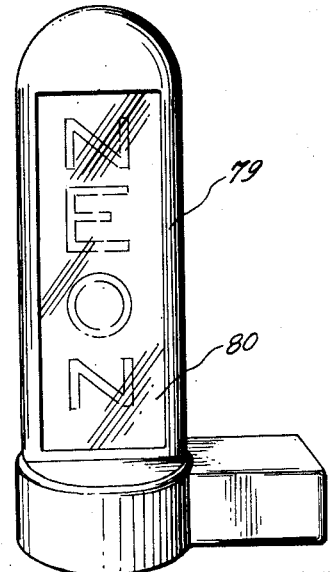
Fig. 7
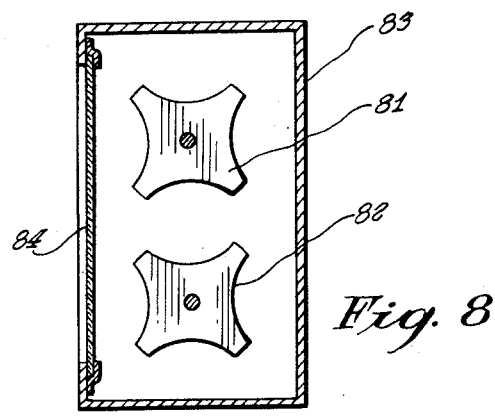
Fig. 8
INVENTOR.
JOHN STADTMILLER
BY Clark & Ott
ATTORNEYS INVENTOR.
JOHN STADTMILLER
BY
Clark & Ott
ATTORNEYS Patented Oct. 17, 1950

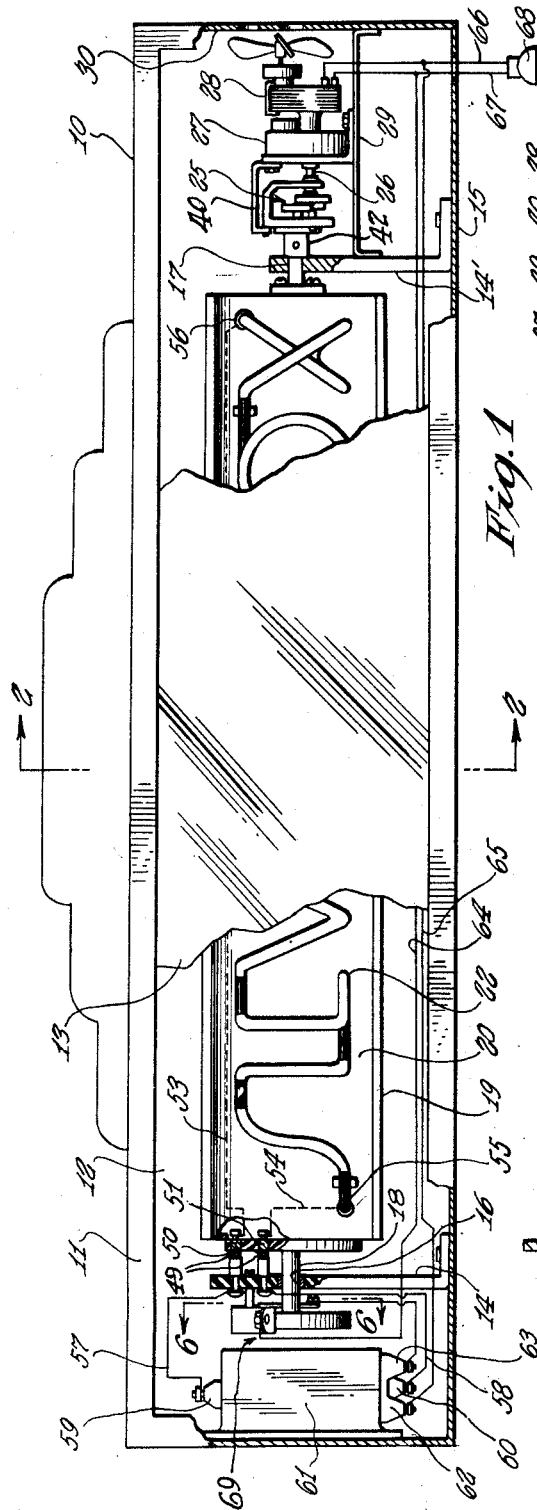

2,526,514

UNITED STATES PATENT OFFICE 2,526,514

ADVERTISING DISPLAY DEVICE WITH INTERMITTENTLY ROTATED NEON SIGNS

John Stadtmiller, New York, N. Y.

Application February 15, 1947, Serial No. 728,834

2 Claims. (Cl. 40—77)

This invention relates to advertising display devices and has particular reference to an illuminated sign for displaying advertising matter which is intermittently rotated for periodically displaying the same.

The invention comprehends an intermittently rotated member having circumferentially spaced advertising matter or legends mounted thereon and which are successively illuminated and moved into position for display through a front panel.

Another object of the invention is the provision of means for intermittently rotating the legend bearing member and for automatically illuminating the legends thereon as the same are arrested in juxtaposition to the display panel.

Still another object of the invention is the provision of an advertising display device of the indicated character in which neon signs form the advertising legends and which are intermittently illuminated by switch means for making and breaking a series of current supply.

With the foregoing and other objects in view, reference is now made to the following specification and accompanying drawings in which the preferred embodiment of the invention is illustrated.

In the drawings:

Fig. 1 is a view in front elevation of an advertising display device constructed in accordance with the invention and illustrating the same with the front panel partly broken away so as to show the operating parts.

Fig. 2 is a transverse vertical sectional view taken approximately on line 2—2 of Fig. 1.

Fig. 3 is an enlarged fragmentary view of the arrangement at one end of the sign for producing intermittent rotation of the driven shaft.

Fig. 4 is a vertical sectional view taken approximately on line 4—4 of Fig. 3.

Fig. 5 is an enlarged fragmentary perspective view with parts broken away and showing the brush and contact means for successively illuminating the advertising legends.

Fig. 6 is an end view of switch means for closing the circuit with the neon signs.

Fig. 7 is a view in front elevation of an advertising display device illustrating a modified form of the invention.

Fig. 8 is a horizontal sectional view of an advertising display device illustrating another modified form of the invention.

Figure 9:
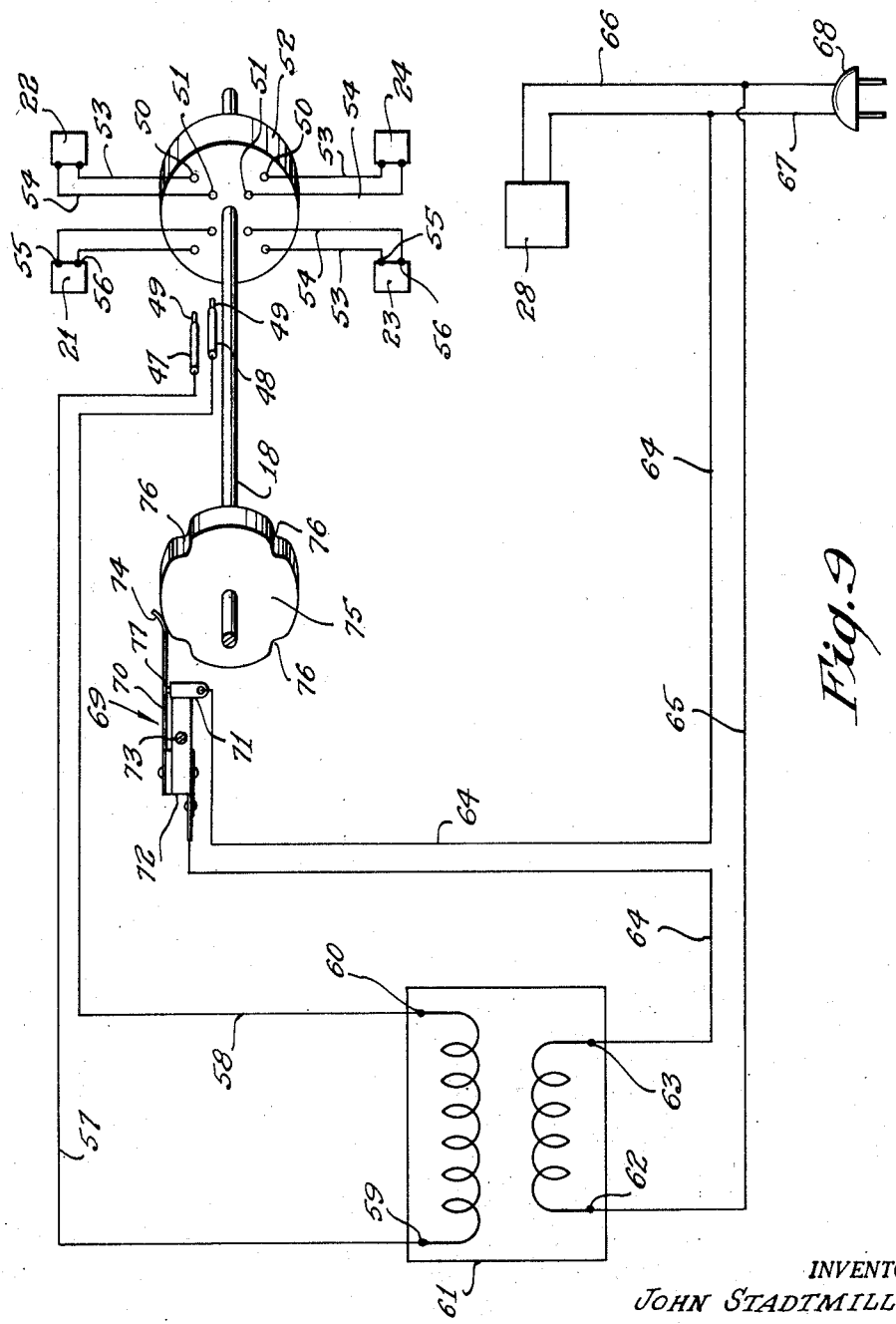
Fig. 9 is a view of the wiring diagram of the advertising display device.

Referring to the drawings by characters of reference, the device includes an elongated housing 10 of rectangular formation in cross-sectional configuration having a front wall 11 formed with a longitudinally extending rectangular opening 12 which is provided with a display panel 13 of glass or other transparent material secured to said wall in covering relation with said opening.

Located within the housing 10 adjacent the opposite ends thereof are spaced standards 14 and 14' secured upon the bottom wall 15 thereof and provided with aligned bearings 16 and 17 in which are mounted the opposite ends of a driven shaft 18. A longitudinally extending member 19 is secured upon the shaft 18 for rotation therewith in juxtaposition to the display panel 13. The member 19 is formed with a plurality of circumferentially spaced arcuate recesses 20 in the periphery thereof in which are arranged neon sings 21 to 24 inclusive constituting advertising legends.

The shaft 18 is intermittently rotated for successively presenting the advertising legends 21 to 24 inclusive in juxtaposition to the display panel 13 through which the legends are visible. The shaft 18 is intermittently rotated by means of an intermittent motion transmitting device 25 arranged on said shaft and on a drive shaft 26 protruding from a reduction gear box 27 and connected with the driving shaft of an electric motor 28. The gear box 27 and the electric motor 28 are mounted upon a bracket 29 secured at its opposite ends to the standard 14' and end wall 30 of the housing 10 so as to dispose the drive shaft 26 in parallel overlapping relation with the driven shaft 18. The intermittent motion transmitting device 25 consists of interengagable radially slotted and flanged disk members 31 and 32 which are respectively mounted on the shafts 18 and 26.

The flanged disk member 32 is formed with an arcuate flange or rim 33 which projects inwardly from the inner face thereof and is disposed in inwardly spaced relation from the periphery thereof. The said flange or rim subtends an arc of approximately 270 degrees and has its ends spaced apart by an arc of approximately ninety degrees. Projecting inwardly from the inner face of said flanged disk member 32 is a pin 34 which is located adjacent one end of the flange or rim 33 and in position to successively engage in radial slots 35 of said radially slotted member 31 for intermittently rotating the same upon rotation of the drive shaft 26.

The radially slotted member 31 is formed with the radial slots 35 quadrantally spaced apart and opening through the periphery thereof and between the slots the said member is arcuately recessed so as to provide peripheral rim portions 36 which are arcuately curved corresponding to the curvature of the outer periphery of the flange or rim 33. The radially slotted and flanged disk members 31 and 32 are mounted on the shafts 18 and 26 between depending legs 37 and 38 of a yoke 39 secured to the inner end of an angle bracket 40 bolted at its outer end to the gear box 27. The shaft 18 protrudes through a bearing opening 41 in the depending leg 37 and secured thereon between said leg and the standard 14' is a sleeve 42 for preventing endwise movement of said shaft. The shaft 26 protrudes through aligned bearing openings 43 and 44 in the legs 37 and 38 of said yoke respectively with the inner end of said shaft being provided with an enlarged head 45 for preventing endwise movement of said shaft so as to retain the flange or rim 33 and the pin 34 of the flanged disk member 32 in lateral alignment with the radially slotted member 31.

In order to provide means for successively illuminating the neon signs 21 to 24 during the periods that the member 19 is at rest and the signs are respectively arranged adjacent to and parallel with the front panel 13, a pair of insulating posts 47 and 48 having flexible metallic brushes 49 protruding therethrough are mounted in the standard 14 with the brushes 49 disposed in the path of movement of pairs of contacts 50 and 51 arranged in a head 52 of the member 19 with the outer surfaces of said contacts disposed substantially flush with the outer face of said head. A pair of the contacts 50 and 51 is provided for each neon sign 21 to 24 inclusive and the same are connected therewith by means of conductor wires 53 and 54 leading from the contacts 50 and 51 respectively to the opposite ends 55 and 56 of the signs. The brushes 49 are connected by conductor wires 57 and 58 leading from the terminals thereof to the secondary terminals 59 and 60 of a transformer 61. The primary terminals 62 and 63 of said transformer are connected by conductor wires 64 and 65 with lead wires 66 and 67 leading from the electric motor 28 to a terminal plug 68.

An electric switch 69 connected with the conductor wire 64 leading to the primary terminal 63 of the transformer is automatically operated for closing the primary circuit as the neon signs are respectively disposed in position adjacent the front panel 13 and for automatically opening the circuit and maintaining the same in open relation during the periods of rotation of the member 19. The electric switch consists of a movable spring terminal 70 and a fixed terminal 71 carried by an insulation block 72 mounted on the end of a stud 73 which is secured to the standard 14 so as to dispose the free end 74 of the spring terminal 70 in engagement with the periphery of a cam disk 75 mounted on the driven shaft 18 for rotation therewith. The cam disk 75 is disposed in spaced relation to the head 52 of the member 19 and the same is formed with quadrantally spaced recesses 76 in the periphery thereof which permit of the movement of the spring terminal 70 into engagement with the adjustable head 77 of the fixed terminal 71 to thereby close the circuit four times during each revolution of the shaft 18 or as each neon sign is presented in juxtaposition to the display panel 13.

The intermittent motion transmitting device 25 is so arranged that during each rotation of the drive shaft 26 the driven shaft 18 and the drive shaft 26 simultaneously rotate one-quarter of a revolution and thereafter the driven shaft 18 remains idle until the drive shaft 26 has completed the remaining portion of the revolution. This is accomplished by the pin 34 rotating in a counter-clockwise direction with the drive shaft 26 engaging in the lowermost slot 35 of the radially slotted member 31 to turn the same through an arc of ninety degrees in a clockwise direction. The pin 34 is then rotated out of engagement with said slot 35 and during the remainder of the revolution of the flanged disk member 32 the flange or rim 33 retains the radially slotted member 31 against rotation. Constructed in this manner the neon signs 21 to 24 are successively disposed in juxtaposition to the display panel 13 and each remains stationary during three-quarters of a revolution of the drive shaft 26. As each neon sign is moved into position the primary circuit with the transformer 61 is automatically closed by the switch 69 and the brushes 49 are moved into engagement with the pair of contacts 50 and 51 which are connected with the sign so located in juxtaposition to the dispaly panel.

In this form of the invention the display device is adapted to be disposed in a horizontal position. If desired however, the device may be vertically arranged as illustrated in Fig. 7 of the drawings with a rotating member 79 similar to the member 19 but having a plurality of neon signs arranged vertically thereon and adapted to be intermittently presented and illuminated in juxtaposition to a front panel 80. As illustrated in Fig. 8, two rotating members 81 and 82 similar to the member 19 in the previous form of the invention may be vertically disposed within the housing 83 for successively presenting and illuminating neon signs in juxtaposition to a front panel 84. It will be understood that the means for intermittently rotating the member 79 and the members 81 and 82 in the form of the inventions illustrated in Figs. 7 and 8 and for successively illuminating the signs carried by said members is in all respects similar to that shown in the previous form of the invention.

The drive shaft 26 is rotated at a constant rate of speed by the motor 28 while the reduction gearing 27 functions to rotate the drive shaft 26 at the speed desired.

What is claimed is:

1. In an advertising display device, a housing having an opening constituting a display panel, a member mounted on a driven shaft for rotation within said housing, a plurality of neon signs secured on said member in circumferentially spaced relation, a drive shaft, interengaging means on said drive and driven shafts for rotating said shafts in unison during a partial rotation thereof and for maintaining the said driven shaft against rotation during the remainder of each rotation of the drive shaft, electric means for continuously rotating said drive shaft at a constant rate of speed, an electric circuit, a head affixed to said driven shaft and located at one end of said member, a pair of contacts for each sign carried by said head in protruding relation through a side face thereof and connected with the opposite ends of said signs respectively, a pair of brushes arranged in said circuit and having their ends disposed in the path of movement of said contacts for successively engaging the pairs thereof, a disk mounted for rotation on said drive shaft having circumferentially spaced cam recesses in the periphery thereof, an electric switch in said circuit and having a fixed terminal and a movable spring terminal tensioned against the periphery of said disk for successively engaging said cam recesses so as to permit of the movement of said spring terminal into closing relation with the fixed terminal for successively illuminating the signs as the same are presented adjacent said display panel during the periods that the driven shaft is at rest.

2. In an advertising display device, a housing having an opening constituting a display panel, a member mounted on a driven shaft for rotation within said housing, a plurality of neon signs secured on said member in circumferentially spaced relation, a drive shaft, interengaging means on said drive and driven shafts for rotating said shafts in unison during a partial rotation thereof and for maintaining the said driven shaft against rotation during the remainder of each rotation of the drive shaft, electric means for continuously rotating said drive shaft at a constant rate of speed, an electric circuit, a head affixed to said driven shaft and located at one end of said member, a pair of contacts for each sign carried by said head in protruding relation through a side face thereof and connected with the opposite ends of said signs respectively, a pair of brushes arranged in said circuit and having their ends disposed in the path of movement of said contacts for successively engaging the pairs thereof, a disk mounted for rotation on said drive shaft having circumferentially spaced cam recesses in the periphery thereof, an electric switch having fixed and movable terminals connected in said circuit and arranged with the movable terminal tensioned against the periphery of said disk for successively engaging said cam recesses to thereby close the circuit for successively illuminating the signs as the same are presented adjacent said display panel during the periods that the driven shaft is at rest and for maintaining the circuit open during the periods that the signs are in rotation with the said driven shaft.

JOHN STADTMILLER.

REFERENCES CITED

The following references are of record in the file of this patent:

UNITED STATES PATENTS

| Number | Name | Date |
|---|---|---|
| 861,798 | Bohannon | July 30, 1907 |
| 1,803,597 | Craig | May 5, 1931 |
| 1,913,504 | Nachumsohn | June 13, 1933 |

FOREIGN PATENTS

| Number | Country | Date |
|---|---|---|
| 74,522 | Germany | Apr. 19, 1894 |